UNITED STATES PATENT OFFICE.

LOUIS M. DENNIS, OF ITHACA, NEW YORK.

CYCLIC PROCESS OF MAKING AROMATIC HYDROCARBON HYDROXY COMPOUNDS.

1,227,894.  Specification of Letters Patent.  Patented May 29, 1917.

No Drawing.  Application filed July 14, 1916. Serial No. 109,212.

*To all whom it may concern:*

Be it known that I, LOUIS M. DENNIS, a citizen of the United States of America, residing at Ithaca, county of Tompkins, State of New York, have invented certain new and useful Improvements in Cyclic Processes of Making Aromatic Hydrocarbon Hydroxy Compounds, of which the following is a specification.

My invention relates to a cyclic process of making aromatic hydrocarbon hydroxy compounds wherein I am enabled to omit certain hitherto usual steps of operation with consequent simplifying of the process. I shall illustrate my invention by describing a process of making phenol from an aromatic hydrocarbon sulfonic acid, whereby among other things, I am enabled, for example, to omit the usual steps of removing the sulfuric acid in the form of difficultly soluble calcium sulfate by treatment with lime and sodium compounds.

In the practice of my process and to form the aromatic hydrocarbon sulfonic acid to be thereafter reacted upon, in this illustration benzene sulfonic acid, I may proceed as follows: I treat benzene with sulfuric acid, preferably fuming sulfuric acid, to produce benzene sulfonic acid in excess of sulfuric acid. I treat this mixture with benzene and, as the sulfuric acid is practically insoluble in benzene, the benzene takes up the benzene sulfonic acid, but not sulfuric acid to any appreciable extent, forming a benzene solution of benzene sulfonic acid substantially free from sulfuric acid. I treat this benzene solution of benzene sulfonic acid with water which dissolves out the benzene sulfonic acid and separates the same from the benzene.

In order to initiate the process and to produce the initial charge of sodium benzene sulfonate, I may then treat the aqueous solution of benzene sulfonic acid substantially free from sulfuric acid with an aqueous solution of sodium hydroxid or other suitable sodium compound or mixture of such compounds, to form sodium benzene sulfonate. This is separated from the solution, dried, and fused with solid sodium hydroxid forming sodium phenolate together with sodium sulfite. The sodium phenolate is then treated with an aqueous solution of benzene sulfonic acid substantially free from sulfuric acid forming phenol and sodium benzene sulfonate, which may be separated by suitable means. The solution of sodium benzene sulfonate is then evaporated to dryness and the dry sodium benzene sulfonate then fused with solid sodium hydroxid forming as before sodium phenolate and sodium sulfite. The sodium phenolate is then neutralized with a fresh charge of benzene sulfonic acid substantially free from sulfuric acid forming as before, phenol and sodium benzene sulfonate and the process repeated. The sodium sulfite which is formed in the process is removed from time to time as may be necessary.

The reactions may be illustrated substantially as follows:—

$C_6H_5SO_3Na + 2NaOH$ (fused) $=$
$\qquad C_6H_5ONa + Na_2SO_3 + H_2O$
$C_6H_5ONa + C_6H_5SO_3H =$
$\qquad C_6H_5OH + C_6H_5SO_3Na$
$C_6H_5SO_3Na + 2NaOH$ (fused) $=$
$\qquad C_6H_5ONa + Na_2SO_3 + H_2O$ and so on.

It will be noted that the sodium benzene sulfonate which is one of the products of reaction on the neutralization of sodium phenolate by benzene sulfonic acid, is again used to be fused with solid sodium hydroxid to again produce sodium phenolate which is in turn neutralized by fresh benzene sulfonic acid substantially free from sulfuric acid, producing phenol and sodium benzene sulfonate again in a cyclic process.

It is obvious that the process is not restricted to the making of phenol as other aromatic hydrocarbon hydroxy bodies may be formed in a similar manner. Where I speak of sulfuric acid being insoluble in benzene I mean of course that it is practically so and where, in the claims, I refer to sulfuric-acid-free benzene sulfonic acid, I mean that sulfuric acid is not present in the benzene sulfonic acid to any appreciable extent. Furthermore, in order to initially form the salt of the sulfonic acid, I may use any suitable substance or compound, preferably one containing sodium, such as sodium hydroxid, sodium carbonate, sodium bi-carbonate or sodium sulfite, or I may use a mixture of any two or more of them.

I claim.

1. A cyclic process of making an aromatic hydrocarbon hydroxy compound consisting in reacting on an aqueous solution of a sulfuric-acid-free aromatic hydro-carbon sulfonic acid with an oxy alkali salt of said aromatic hydrocarbon to form the hydroxy compound and the alkali salt of the aromatic hydrocarbon sulfonic acid, separating the products of the reaction, fusing the alkali salt with an alkali hydroxid to again produce the oxy alkali salt of the aromatic hydrocarbon, and treating the latter with a fresh charge of sulfuric-acid-free aromatic hydrocarbon sulfonic acid, and repeating the steps.

2. A cyclic process of making phenol consisting in reacting on an aqueous solution of sulfuric-acid-free benzene sulfonic acid with an alkali phenolate to form phenol and the alkali benzene sulfonate, separating the products of the reaction, fusing the sulfonate with alkali hydroxid to again produce alkali phenolate, and treating the latter with a fresh charge of sulfuric-acid-free benzene sulfonic acid, and repeating the steps.

3. A cyclic process of making phenol consisting in reacting on an aqueous solution of sulfuric-acid-free benzene sulfonic acid with sodium phenolate to form phenol and sodium benzene sulfonate, separating the products of the reaction, fusing the sulfonate with sodium hydroxid to again produce sodium phenolate, and treating the latter with a fresh charge of sulfuric-acid-free benzene sulfonic acid, and repeating the steps.

In testimony whereof I have signed this specification.

LOUIS M. DENNIS.